US012791061B2

(12) United States Patent
Loiseau et al.

(10) Patent No.: US 12,791,061 B2
(45) Date of Patent: Nov. 10, 2026

(54) PILLOW BLOCK ASSEMBLY

(71) Applicant: AKTIEBOLAGET SKF, Gothenburg (SE)

(72) Inventors: Valerie Loiseau, Puteaux (FR); Laurent Garnier, Hermeray (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 18/874,616

(22) PCT Filed: Jun. 21, 2022

(86) PCT No.: PCT/EP2022/066872
§ 371 (c)(1),
(2) Date: Dec. 13, 2024

(87) PCT Pub. No.: WO2023/247016
PCT Pub. Date: Dec. 28, 2023

(65) Prior Publication Data

US 2025/0361910 A1 Nov. 27, 2025

(51) Int. Cl.
*F16C 33/80* (2006.01)

(52) U.S. Cl.
CPC .................................. *F16C 33/805* (2013.01)

(58) Field of Classification Search
CPC ... F16C 33/805; F16C 35/047; F16J 15/3232; F16J 15/3264
See application file for complete search history.

(56) References Cited

U.S. PATENT DOCUMENTS 4,533,264 A * 8/1985 Haugwitz ............... F16C 33/80 384/406
6,921,211 B2 * 7/2005 Olsson ................ F16C 33/6651 384/480
2022/0213930 A1 7/2022 Kenworthy et al.

FOREIGN PATENT DOCUMENTS

AU 2009217408 A1 4/2010
DE 102019207156 A1 11/2020
EP 0608672 A1 * 8/1994 ............ F16C 35/047

(Continued)

OTHER PUBLICATIONS

International Search Report and Written Opinion dispatched Dec. 28, 2023 in related application No. PCT/EP2022/066872.

*Primary Examiner* — James Pilkington
(74) *Attorney, Agent, or Firm* — J-TEK LAW PLLC; Scott T. Wakeman; Mark A. Ussai

(57) ABSTRACT

A pillow block assembly is for supporting a shaft for rotating about an axis of rotation, the pillow block assembly including a bearing housing, having an interior accommodating a shaft bearing, and a seal assembly. The bearing housing is split along a first plane accommodating the axis of rotation into a first bearing housing half and a second bearing housing half. The seal assembly includes at least one radial shaft seal with at least one seal lip, preferably having a spring adapted to bias the seal lip, and a spacer adapted to be fitted around the shaft and adapted to rotate with the shaft, the spacer having a radially outwardly directed first sealing surface. The seal assembly further includes a cover at least partially surrounding the first sealing surface of the spacer, the cover being reversibly secured to the housing. The radial shaft seal is arranged to seal between the cover and the first sealing surface of the spacer.

8 Claims, 4 Drawing Sheets

(56) References Cited

FOREIGN PATENT DOCUMENTS

| | | | | |
|---|---|---|---|---|
| EP | 1394429 | B1 | 5/2007 | |
| WO | WO-2009042478 | A1 * | 4/2009 | ............ F16C 19/386 |

* cited by examiner

PILLOW BLOCK ASSEMBLY

CROSS-REFERENCE

This application is the U.S. National Stage of International Application No. PCT/EP2022/066872 filed on Jun. 21, 2022.

TECHNICAL FIELD

The present invention relates to a pillow block assembly for supporting a shaft for rotating about an axis of rotation, the pillow block assembly comprising a bearing housing having an interior accommodating a shaft bearing and a seal assembly.

BACKGROUND OF THE INVENTION

Pillow block assemblies are known in the field of rolling bearing assemblies, and it is common to make use of pillow block assemblies in connection with for example heavy machinery for the manufacturing industry. One example is the pulp & paper industry, where for example cylinders of pulp and paper machinery are supported by pillow block assemblies. These pillow block assemblies are working under harsh conditions due to the high speed as well as the high temperature of the cylinders, which is true especially for the pillow block assemblies supporting the cylinders of the drying portion of a pulp & paper machinery. These pillow block assemblies used in a pulp & paper machinery are normally lubricated with oil in order to withstand the mentioned harsh conditions, and the seal assembly of these pillow block assemblies comprise labyrinth seals.

Australian patent publication no. AU2009217408A1 and German patent publication no. DE102019207156A1 each disclose a bearing housing with a contact lip seal between the housing and a rotating shaft to seal up between the interior of the housing and the outside.

However, overtime the sealing system or seal assembly of pillow block assemblies degrades, and oil leakages will appear. These oil leakages will lead to different problems and are therefore unwanted. Firstly, the leaking oil can contaminate or damage the product, for example manufactured by the pulp & paper machinery. This is under no circumstances acceptable, and, especially when producing sterile paper for packaging of medical equipment, could result in serious consequences. The damaged paper needs to be destroyed, which is a loss of production. And if the damaged paper is not discovered after production, a recall of the damaged paper is necessary, resulting in a bad reputation as well as in associated costs. Secondly, external pollution like dust, cleaning fluid et cetera may enter inside the housing and contaminate the oil. This would degrade the lubrication properties of the oil and damage the bearings in the long run. A production stop would be necessary to clean the machinery and to repair or replace the broken parts. Accordingly, to avoid the abovementioned problems the sealing system or seal assembly of pillow block assemblies are regularly replaced as a corrective maintenance. But even a scheduled maintenance would lead to a production stop.

SUMMARY OF THE INVENTION

In view of the above, an object of the present invention is to provide an improved pillow block assembly. More particularly, an object of the present invention is to provide a pillow block assembly that allows for an easy and less time-consuming replacement of the seals respective the seal assembly of the bearing housing.

These and other objects are met by the subject matter as specified in independent claim 1. Preferred embodiments of the invention can be found in the dependent claims and in the accompanying description and drawings.

According to the invention, a pillow block assembly for supporting a shaft for rotating about an axis of rotation comprise a bearing housing having an interior accommodating a shaft bearing, and a seal assembly, the bearing housing being split along a first plane accommodating the axis of rotation into a first bearing housing half and a second bearing housing half, wherein the seal assembly comprises at least one radial shaft seal with at least one seal lip, preferably comprising a spring means adapted to bias the seal lip, and a spacer adapted to be fitted around the shaft and adapted to rotate with the shaft, the spacer having a radially outwardly directed first sealing surface, wherein the seal assembly further comprises a cover at least partially surrounding the first sealing surface of the spacer, wherein the cover is reversibly secured to the housing, and wherein the radial shaft seal is arranged to seal between the cover and the first sealing surface of the spacer.

With this improved pillow block assembly in accordance with the invention, and especially with the arrangement of a spacer with a radially outwardly directed first sealing surface and a cover, where a radial shaft seal is arranged to seal between the cover and the first sealing surface of the spacer, an easy and less time-consuming replacement of the seals in the seal assembly of a bearing housing is achieved. That is true both for the cylinder side of the bearing housing, i.e., the side where no shaft is entering the bearing housing and where the opening of the bearing housing is covered by a lid or cover, as well as for the wheel side of the bearing housing, i.e., the side where a shaft is entering the bearing housing.

According to a preferred embodiment of the invention, the radial shaft seal is arranged on the cover, and the seal is biased towards the spacer to seal between the cover and the first sealing surface of the spacer. This arrangement further improves the maintenance as well as the sealing properties of the seal assembly. A further preferred embodiment of the invention provides a pillow block assembly, wherein the seal assembly further comprises a gap seal arranged between the cover and the spacer, on a side of the radial shaft seal facing towards the interior of the housing. By this additional seal, the sealing properties are further improved and, in addition, can be adapted to different technical and design requirements, depending on the overall specification for the pillow block assembly.

A still further preferred embodiment of a pillow block assembly in accordance with the invention provides an axial labyrinth seal, arranged between the cover and the spacer on a side of the radial shaft seal facing away from the interior of the housing.

Advantageously, by arranging different type of seals in a predefined order within the seal assembly, the sealing properties as well as the maintenance properties of the pillow block assembly can be adapted to specific and different technical and design requirements, depending on the intended use of the pillow block assembly.

Furthermore, depending on the required sealing properties as well as the maintenance properties of the pillow block assembly, the seal assembly may be arranged within the interior of the bearing housing, it may be arranged within the opening in the side of the bearing housing where a shaft enter the bearing housing, or it may be arranged at the outside of the bearing housing surrounding the opening in the side of the bearing housing where a shaft enter the bearing housing. Depending on the requirements for a specific pillow block assembly, the seal assembly may be arranged both within the interior of the bearing housing and within the opening in the side of the bearing housing where a shaft enter the bearing housing, or it may be arranged both within the opening in the side of the bearing housing where a shaft enter the bearing housing and at the outside of the bearing housing surrounding the opening in the side of the bearing housing where a shaft enter the bearing housing. However, the seal assembly may be arranged within the interior of the bearing housing, within the opening in the side of the bearing housing where a shaft enter the bearing housing, and at the outside of the bearing housing surrounding the opening in the side of the bearing housing, covering all three areas. Since this will influence the sealing properties as well as the maintenance properties of the pillow block assembly, this is depending on the intended use for the specific pillow block assembly.

According to another preferred embodiment of the pillow block assembly, a contact leap seal is arranged between the cover and the spacer between the radial shaft seal and the axial labyrinth seal. By this additional seal, the sealing properties are further improved and, in addition, can be adapted to different technical and design requirements, depending on the overall specification for the pillow block assembly.

In accordance with a further preferred embodiment of the pillow block assembly, the contact lip seal is arranged on the cover, wherein the contact lip seal is adapted to seal between the cover and the first sealing surface of the spacer. This arrangement allows for further improved sealing properties and, in addition, can be adapted to different technical and design requirements, depending on the overall specification for the pillow block assembly.

The pillow block assembly provides surface formations, preferably in the form of machined grooves, that are arranged on the spacer towards the interior of the housing and are adapted to serving as oil flingers.

Advantageously, by arranging different type of seals in a predefined order within the seal assembly, the sealing properties as well as the maintenance properties of the pillow block assembly can be adapted to specific and different technical and design requirements, depending on the intended use of the pillow block assembly.

With this improved pillow block assembly in accordance with the invention, an easy and less time-consuming replacement of the seals in the seal assembly of a bearing housing is achieved. That is true both for the cylinder side of the bearing housing, i.e., the side where no shaft is entering the bearing housing and where the opening of the bearing housing is covered by a lid or cover, as well as for the wheel side of the bearing housing, i.e., the side where a shaft is entering the bearing housing.

As it will become evident from the detailed description of preferred embodiments of the invention, which follows later, the removal or replacement of the seals in the seal assembly will easily achieved and could be conducted, for example, as follows.

With regard to the cylinder side of the bearing housing, the lid or cover covering the bearing housing interior of the pillow block assembly will be removed, and the seals respective the seal assembly, which are arranged on a cover or drip breaker part and are accessible from the outside, will be removed with an appropriate tool, for example a hook. The accessible parts of the opening of the bearing housing as well as the shaft will be thoroughly cleaned, and the surface condition of visible surfaces will be checked. If the seals respective the seal assembly are still in a good condition, they will be reassembled. If the seals respective the seal assembly need to be replaced, new seals respective a new seal assembly will be mounted after the cleaning process. With the new seals or seal assembly mounted, the lid or cover will be reassembled to cover the opening in the side of the bearing housing.

Regarding the wheel side of the bearing housing, where a shaft is entering the bearing housing, and where according to the invention a spacer is arranged on the shaft, fastening means, fixedly connecting the spacer with the shaft to allow the spacer to rotate together with the shaft, will be removed or unlocked, and the spacer will be pulled away from the bearing housing to allow access to the opening in the bearing housing. The mentioned access is possible between the shaft and a cover or drip breaker part, on which the seals respective the seal assembly are arranged. The cover is in accordance with the invention fixedly connected with the bearing housing and surrounds the opening in the side of the bearing housing. In a next step, the seals respective the seal assembly will be removed with an appropriate tool, for example a hook. The accessible parts of the opening of the bearing housing as well as the shaft will be thoroughly cleaned, and the surface condition of visible surfaces will be checked. If the seals respective the seal assembly are still in a good condition, they will be reassembled. If the seals respective the seal assembly need to be replaced, new seals respective a new seal assembly will be mounted after the cleaning process. With the new seals or seal assembly mounted on the cover or drip breaker part, the spacer will be put back in place with the help of a support frame or adjustment tool, as described later. When the spacer is back in place, the spacer will be fixedly connected with the shaft by fasting means to allow the spacer to rotate together with the shaft, the support frame or adjustment tool will be removed, and the bearing housing respective the pillow block assembly is ready for operation.

BRIEF DESCRIPTION OF THE DRAWINGS

The various aspects of the invention, including its particular features and advantages, will be readily understood from the following illustrative and nonlimiting detailed description of an exemplary embodiment of the present invention, wherein.

Figure 1:
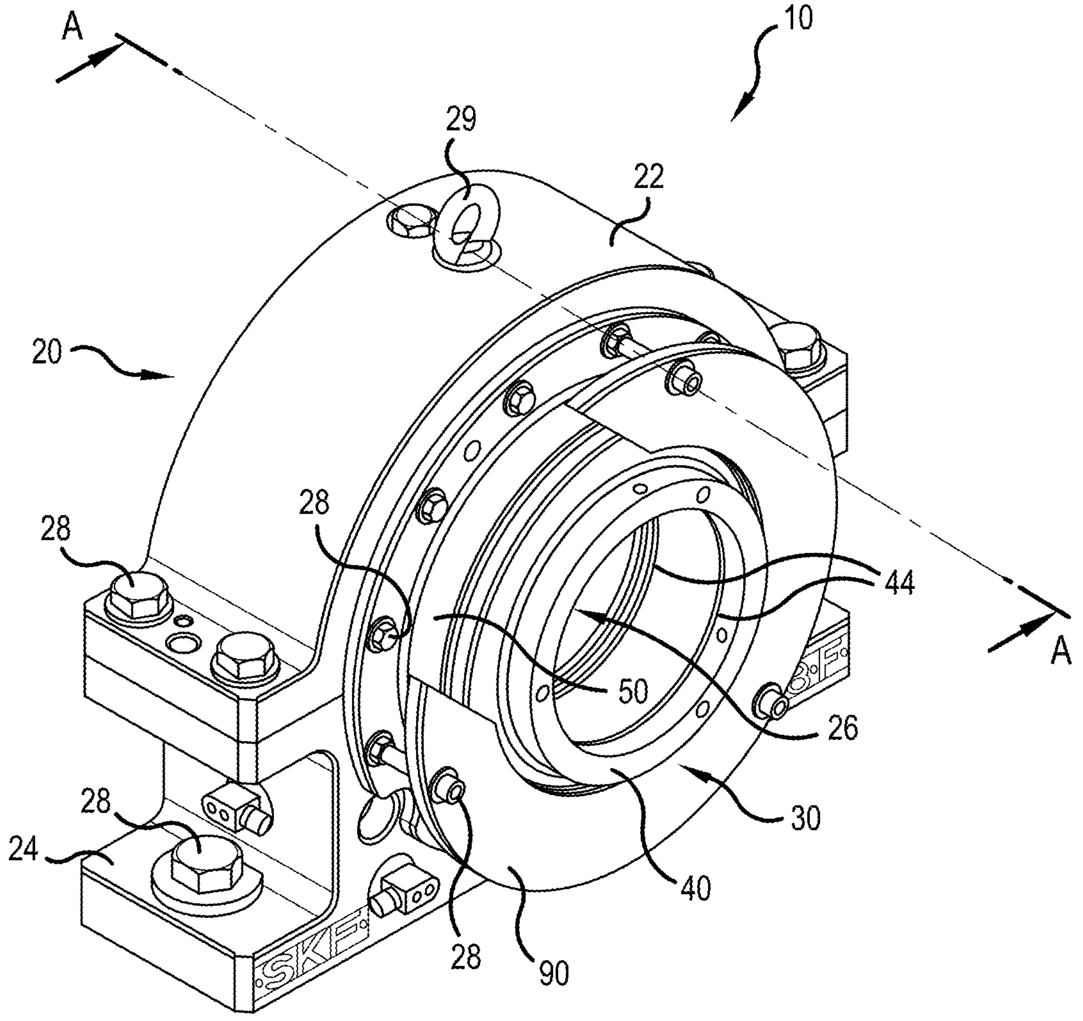
FIG. 1 shows a schematic view of a pillow block assembly according to an example embodiment of the present invention.

The drawings show diagrammatic exemplifying embodiments off the present invention and are thus not necessarily drawn to scale. It shall be understood that the embodiments shown and described are exemplifying and that the invention is not limited to these embodiments. It should also be noted that some details in the drawings may be exaggerated in order to better describe and illustrate the invention.

Throughout the detailed description, like reference numerals refer to like elements, unless explicitly expressed otherwise.

DETAILED DESCRIPTION OF PREFERRED EMBODIMENTS

The present invention will now be described more fully hereinafter with reference to the accompanying drawings, in which a currently preferred embodiment of the invention is shown. This invention may, however, be embodied in many different forms and should not be construed as limited to the embodiments set forth herein; rather, these embodiments are provided for thoroughness and completeness, and fully convey the scope of the invention to the skilled person.

With reference to FIG. 1, a pillow block assembly 10 according to an example embodiment of the present invention is shown in a schematic and perspective view. The pillow block assembly 10 has a bearing housing 20 with a first bearing housing half 22 and a second bearing housing half 24. The bearing housing half 22 and the bearing housing half 24 are secured to each other by fastening means 28, here in the form of bolts 28. The second bearing housing half 24 is furthermore adapted to be secured to a fundament by means of further fastening means 28 also in the form of bolts 28. On top of the pillow block assembly 10 is a lifting means 29 in form of a ringbolt 29 arranged, which allows a simple and secure lifting of the pillow block assembly 10 with the help of commonly known lifting arrangements (not shown) normally provided in the locations where machinery and pillow block assemblies are mounted.

The bearing housing 20 has a bearing housing interior 26 accommodating a shaft bearing (not shown) and a seal assembly, which is not shown here either, but will be explained later in the following with reference to the FIGS. 2 to 4.

The pillow block assembly 10 is designed for supporting a shaft (not shown) for rotating about an axis of rotation. To achieve this, a shaft (not shown) is inserted into the pillow block assembly 10 and supported by a shaft bearing (not shown) in the bearing housing interior 26. The shaft bearing (not shown) is lubricated with oil, and to avoid leakage of the oil a seal assembly 30 is provided, preferably on both sides of the pillow block assembly 10. However, depending on the circumstances and design requirements, and especially when a shaft will not completely pass through the pillow block assembly 10, one side of the pillow block assembly 10 could be covered by an appropriate adapted lid or cover and comprise a seal assembly 30 or a different seal assembly.

Parts of the seal assembly 30 that are visible in this view are described here, the remaining parts of the seal assembly 30 will be described later with reference to FIGS. 2 to 4. A spacer 40 is arranged to be fitted on a shaft (not shown), and in order to seal between the shaft and the spacer 40 to avoid leakage of oil, a seal 44 in form of an O-ring is provided on the inside of the spacer 40 at each end of it. As it will be explained later, it is intended that the spacer 40, once fitted on a shaft, will rotate together with the shaft. To achieve this, the spacer 40 will be reversibly fixed to the shaft with commonly known fixing means not explained or shown here.

The spacer 40 cooperates with a cover 50, which is reversibly fixed to the bearing housing 20 by means of fastening means 28, here in the form of bolts 28. Outside of the spacer 40 is a support frame 90 arranged, at least partially surrounding the spacer 40 and reversibly fixed to the bearing housing 20 by means of fastening means 28, here in the form of bolts 28. The support frame 90 is an adjustment tool used to place the spacer 40 in the correct position on the shaft (not shown) in relation to the bearing housing 20. Accordingly, the support frame 90 is used only temporarily when mounting the spacer 40 on the shaft (not shown), and not a permanent part of the pillow block assembly according to the invention. However, it is an important part to assure the correct positioning of the spacer 40 on the shaft (not shown) in relation to the bearing housing 20.

The bearing housing 20 of the pillow block assembly 10 with the support frame (or adjustment tool) 90 is, with other words, shown in the state just after the mounting of the spacer 40 on a shaft (not shown) in the correct position in relation to the shaft (not shown) and the bearing housing 20.

Figure 2:
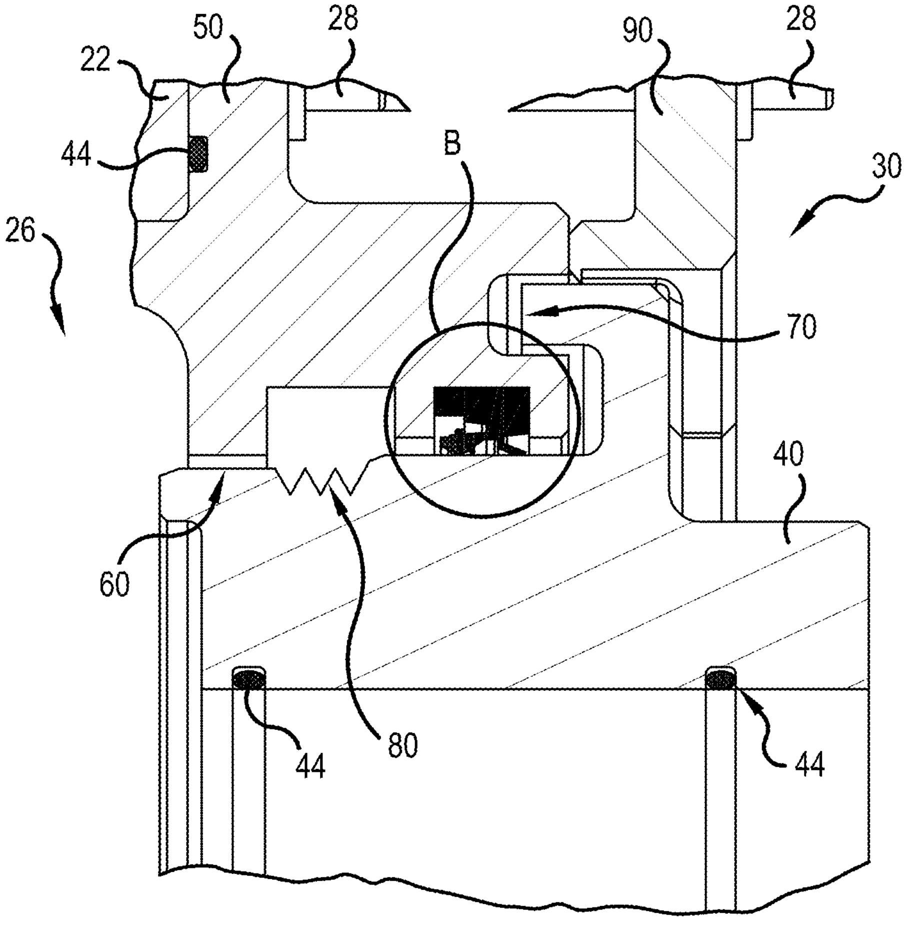
FIG. 2 shows a partially cut-out view of the pillow block assembly of FIG. 1 along the line A-A shown in FIG. 1.

Referring now to FIG. 2, FIG. 2 depict an enlarged view of a seal assembly 30 in accordance with the invention. This view is a result of a cut through the pillow block assembly 10 of FIG. 1 along the line A-A, looking into the direction of the arrows. The seal assembly 30 is adapted to seal the interior 26 of the pillow block assembly 10 from the exterior. The seal assembly 30 comprises a spacer 40 arranged to be fitted on a shaft (not shown), having a seal 44 in form of an O-ring on the inside at each end. This will avoid leakage of oil between the shaft (not shown) and the spacer 40 when the spacer 40 is fitted on the shaft (not shown). The seal assembly 30 further comprises a cover 50, reversibly fixed to the bearing housing 20, in this view to the first bearing house half 22 of the bearing housing 20. To avoid leakage of oil between the first bearing house half 22 and the cover 50, a seal 44 in form of an O-ring is arranged between the first bearing house half 22 and the cover 50. The seal assembly 30 furthermore comprises a support frame 90, arranged on the outside of the pillow block assembly 10 and reversibly fixed to the bearing housing 20, in this view to the first bearing house half 22 of the bearing housing 20.

The support frame (or adjustment tool) 90 surround the spacer 40, at least partially, and support spacer 40 to assure the correct positioning of the spacer 40 on the shaft (not shown) in relation to the bearing housing 20 and the cover 50, when mounting the spacer 40 in the correct position on the shaft (not shown) in relation to the bearing housing 20. Accordingly, the support frame 90 is used only temporarily when mounting the spacer 40 on the shaft (not shown), and not a permanent part of the pillow block assembly according to the invention. However, it is an important part to assure the correct positioning of the spacer 40 on the shaft (not shown) in relation to the bearing housing 20.

In order to control and, if necessary, to replace the sealing arrangement B (sealing arrangement B will be described in the following with reference to the FIGS. 3 and 4) fastening means (not shown), fixedly connecting the spacer 40 with the shaft (not shown) to allow the spacer 40 to rotate together with the shaft (not shown), will be removed or unlocked, and the spacer 40 will be pulled away from the bearing housing 20 to allow access to the opening in the bearing housing 20. The mentioned access is possible between the shaft (not shown) and the cover or drip breaker part 50, on which the sealing arrangement B is arranged. The cover 50 is in accordance with the invention fixedly connected with the bearing housing 20 (here shown the first bearing housing half 22) and surrounds the opening in the side of the bearing housing 20.

In a next step, the sealing arrangement B will be removed with an appropriate tool, for example a hook. The accessible parts of the opening of the bearing housing 20 as well as the shaft (not shown) will be thoroughly cleaned, and the surface condition of visible surfaces will be checked. If the sealing arrangement B is still in a good condition, it will be reassembled. If the sealing arrangement B need to be replaced, a new sealing arrangement B will be mounted after the cleaning process. With the new sealing arrangement B mounted on the cover or drip breaker part 50, the spacer 40 will be put back in place with the help of a support frame or adjustment tool 90, as described. When the spacer 40 is back in place, the spacer 40 will be fixedly connected with the shaft (not shown) by fasting means (not shown) to allow the spacer 40 to rotate together with the shaft (not shown), the support frame or adjustment tool 90 will be removed, and the bearing housing 20 respective the pillow block assembly 10 is ready for operation.

The seal assembly 30 comprises several sealing arrangements, which will be explained in the following. Starting from the inside, the bearing housing interior 26, there is gap seal 60, sealing between the spacer 40 and the cover 50 towards the interior 26 of the bearing housing 20. After the gap seal 60, counting from the interior 26, are surface formations 80 arranged, here in the form of machined grooves, adapted to serve as oil flingers 80. Since the spacer 40 will rotate with the shaft (not shown) when fitted on the shaft, any oil on the oil flingers 80 will be thrown away due to the rotation of the spacer 40 and collected for reuse. These oil flingers 80 and their function are well known and will therefore not be explained further here.

After the oil flingers 80, counting from the interior 26, is a sealing arrangement provided, marked with a circle B. This sealing arrangement B will be described in the following with reference to the FIGS. 3 and 4.

After the sealing arrangement B, counting from the interior 26, an axial labyrinth seal 70 is provided. Axial labyrinth seals are well known and will therefore not be explained further here.

Figure 3:
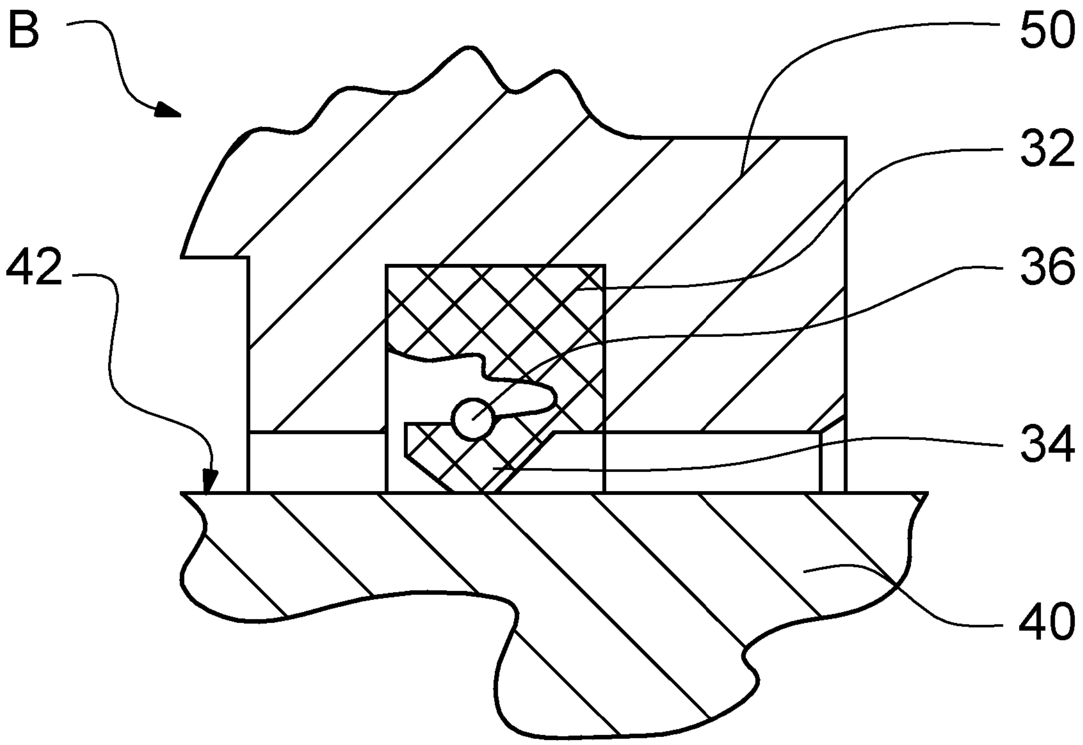
FIG. 3 shows an enlarged portion of the cut-out view of FIG. 2, marked with the circle B, depicting a portion of a first example embodiment of the seal assembly comprising one radial shaft seal.
Figure 4:
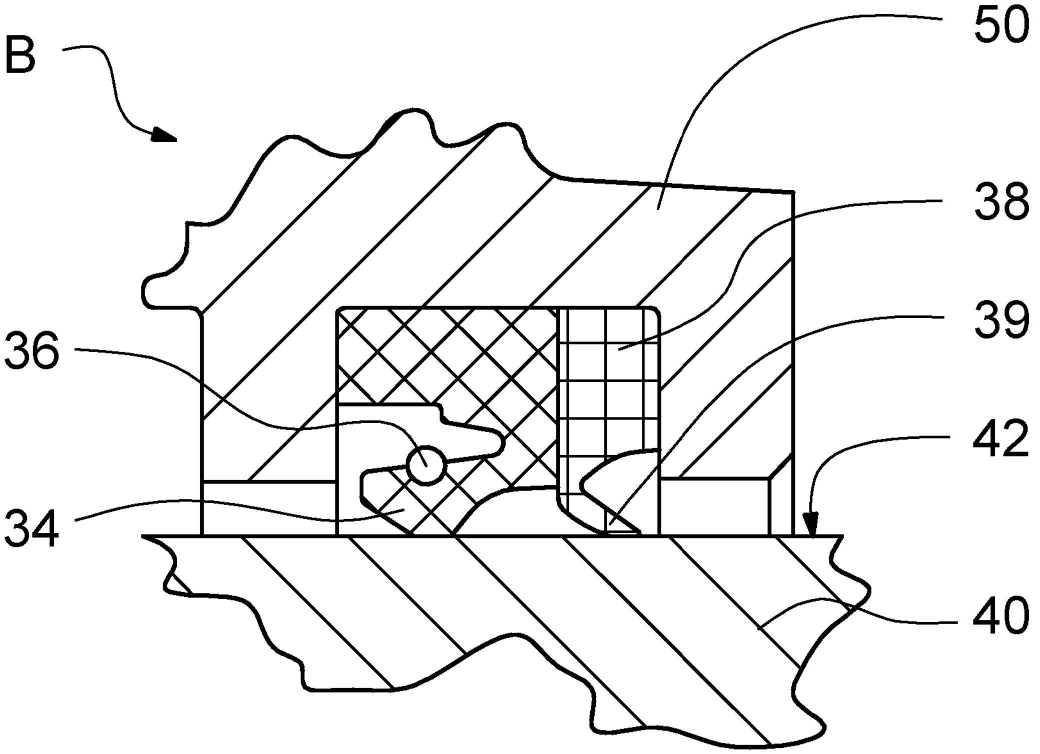
FIG. 4 shows an enlarged portion of the cut-out view of FIG. 2, marked with the circle B, depicting a portion of a second example embodiment of the seal assembly comprising a radial shaft seal and a contact lip seal.

Turning now to FIGS. 3 and 4, and starting with FIG. 3, here a preferred embodiment of the sealing arrangement B, marked with the circle B in FIG. 2, is shown in an enlarged view. This preferred embodiment comprises a radial shaft seal 32 fixedly arranged in a recess provided in the cover 50. The radial shaft seal 32 comprises a seal lip 34 and a spring means 36, here in the form of a garter spring. The spring 36 bias the seal lip 34 against a first sealing surface 42 arranged on the spacer 40. By means of this arrangement the radial shaft seal 32 prevents the leakage of oil between the cover 50 and the spacer 40.

FIG. 4 shows a further preferred embodiment of the sealing arrangement B, marked with the circle B in FIG. 2, in an enlarged view. This preferred embodiment comprises a radial shaft seal 32 and a contact lip seal 38, both fixedly arranged beside each other in a recess provided in the cover 50. The radial shaft seal 32 comprises a seal lip 34 and a spring means 36, here in the form of a garter spring. The spring 36 bias the seal lip 34 against a first sealing surface 42 arranged on the spacer 40. The contact lip seal 38 comprises a seal lip 39 biased against the first sealing surface 42. By means of this arrangement the radial shaft seal 32 and the contact lip seal 38 provides a further improved sealing and prevents the leakage of oil between the cover 50 and the spacer 40.

The invention claimed is:

1. A pillow block assembly for supporting a shaft rotatable about an axis of rotation, the pillow block assembly comprising:
- a bearing housing having an interior accommodating a shaft bearing, the bearing housing being split along a first plane accommodating the axis of rotation into a first bearing housing half and a second bearing housing half; and
- a seal assembly including at least one radial shaft seal with at least one seal lip, a spacer fitted around the shaft and rotatable with the shaft, the spacer having a radially outwardly directed first sealing surface, and a cover at least partially surrounding the first sealing surface of the spacer, the cover being releasably secured to the housing, the radial shaft seal being arranged to seal between the cover and the first sealing surface of the spacer and surface formations are arranged on the spacer facing towards the interior of the housing and serve as oil flingers.

2. The pillow block assembly according to claim 1, wherein the radial shaft seal is arranged on the cover and the at least one seal lip is biased towards the spacer to seal between the cover and the first sealing surface of the spacer.

3. The pillow block assembly according to claim 1, wherein the seal assembly further includes a gap seal arranged between the cover and the spacer on a side of the radial shaft seal facing towards the interior of the housing.

4. The pillow block assembly according to claim 1, wherein an axial labyrinth seal is arranged between the cover and the spacer on a side of the radial shaft seal facing away from the interior of the housing.

5. The pillow block assembly according to claim 4, wherein a contact lip seal is arranged between the cover and the spacer between the radial shaft seal and the axial labyrinth seal.

6. The pillow block assembly according to claim 5, wherein the contact lip seal is arranged on the cover and seals between the cover and the first sealing surface of the spacer.

7. The pillow block assembly according claim 1, wherein the interior of the bearing housing accommodates a shaft bearing and two seal assemblies each arranged on a separate side of the interior.

8. The pillow block assembly according to claim 1, wherein the seal assembly further includes a spring adapted to bias the at least one seal lip and/or the surface formations on the spacer are in the form of machined grooves.

* * * * *